United States Patent [19]

Van Ooij

[11] Patent Number: 4,911,991

[45] Date of Patent: Mar. 27, 1990

[54] METAL WIRES USED FOR REINFORCING ELASTOMERIC MATERIAL

[75] Inventor: Wim J. Van Ooij, Golden, Colo.

[73] Assignee: Pirelli Coordinamento Pneumatici S.p.A., Italy

[21] Appl. No.: 159,602

[22] Filed: Feb. 24, 1988

[30] Foreign Application Priority Data

Mar. 2, 1987 [IT]  Italy ............................. 19541 A/87

[51] Int. Cl.$^4$ ..................... B32B 15/00; B32B 15/06
[52] U.S. Cl. ......................... 428/658; 57/902; 152/451; 152/565; 428/625; 428/659; 428/679
[58] Field of Search ............ 428/625, 659, 658, 679; 152/451, 565; 57/902

[56] References Cited

U.S. PATENT DOCUMENTS

| | | | |
|---|---|---|---|
| 1,984,335 | 12/1934 | Crapo | 428/659 |
| 2,038,551 | 4/1936 | Domm | 428/659 |
| 2,296,838 | 9/1942 | Domm | 428/659 |
| 2,870,526 | 1/1959 | Adler | 428/659 |
| 4,226,918 | 10/1980 | Friend | 152/451 |
| 4,407,900 | 10/1983 | Kirihara et al. | 428/659 |
| 4,659,631 | 4/1987 | Kurimoto et al. | 428/659 |
| 4,704,337 | 11/1987 | Coppens et al. | 152/451 |

FOREIGN PATENT DOCUMENTS

| | | | |
|---|---|---|---|
| 82604 | 7/1981 | Japan | 152/451 |
| 2039580 | 8/1980 | United Kingdom | 152/451 |

*Primary Examiner*—Robert McDowell
*Attorney, Agent, or Firm*—Stevens, Davis, Miller & Mosher

[57] ABSTRACT

This invention relates to metal wire used to produce reinforcing elements for articles of elastomeric material. The wire is provided with a coating ensuring at the same time a good resistance to corrosion, good values of initial adhesion, and a low decay, due to ageing, of the bond with the elastomeric material, said coating being constituted by two concentric layers of a Zn/Ni alloy, where the radially inner layer contains Zn in an amount ranging between 60% and 90% based on total layer and the radially outer layer contains Ni in an amount ranging between 60% and 80% based on the total layer.

11 Claims, No Drawings

METAL WIRES USED FOR REINFORCING ELASTOMERIC MATERIAL

DESCRIPTION OF THE INVENTION

The present invention relates to metal wires provided with an anti-corrosion coating ensuring a very good adhesion to elastomeric materials and, in particular, it refers to the fine steel wires used to obtain the well known cords used as reinforcement in articles of elastomeric material, as for instance pneumatic tires, conveyor belts, driving belts, and the like.

It is known that these wires must simultaneously possess characteristics of good resistance to corrosion and good adhesion to the elastomeric material, qualities which a naked steel wire does not possess in any degree. As a result, the wire must be covered with a suitable coating.

After having checked the results obtainable with single metal coatings, scientists some time ago adopted for the above mentioned wires a brass coating, namely a copper and zinc (Cu/Zn) alloy, containing for example 70% copper and 30% zinc, which in the past gave good results in general as regards adhesion but showed insufficient protection in respect of corrosion. In fact, during the vulcanization process, the copper in the alloy reacts with the sulphur present in the compound, thus creating a thin layer of copper sulphide which forms an interface between the compound and the wire, providing a good initial adhesion of the compound to the brass coating surrounding said wire. However, with ageing the rubber/metal bonding, which is at its strongest immediately after the vulcanization cycle, decays considerably; in fact, not only is there a deterioration in the characteristics of the layer of copper sulphide, but also in those of the underlying brass layer, owing to the continuing corrosion.

Efforts to improve this situation have led to the adoption of alloys other than brass, for example ternary alloys, or to the substitution either of the copper or of the zinc with alternative metals.

Of all the alloys tested, those composed of zinc and nickel or of zinc and cobalt have proved to be of particular interest. In fact, substituting copper with nickel or cobalt reduces degradation of adhesion through ageing; however, the problem of increasing the maximum level of adhesion and at the same time the resistance to corrosion remains unresolved.

In terms of alloy composition, these two characteristics are in fact contradictory: increasing the percentage of a metal (for example Ni) improves one characteristic (in this case, adhesion to the elastomeric material), but causes deterioration of the other, so that research can only lead to a better compromise between the different requirements.

In accordance with the present invention, a new type of coating has been discovered which resolves the difficulties illustrated and has at the same time managed to improve both of these desired characteristics.

Accordingly, the subject matter of the present invention is a metal wire for the reinforcement of articles of elastomeric material, provided with an anticorrosion coating and suitable for the attainment of adhesion to the elastomeric material into which said wire is incorporated, the coating being substantially composed of a zinc and nickel alloy, characterized by the fact that said coating comprises two concentric layers, placed radially one above the other, each layer being made of a Zn/Ni alloy, the layer with the highest percentage of Zn being the radially inner layer.

Conveniently, the radially innermost layer will contain a Zn percentage ranging between 60% and 90%, while the difference between the percentages of Ni concentration in the two superimposed layers will be at least 20%, obviously, the difference between this value and 100%, in both layers, will be supplied by the other metal of the alloy.

The present invention will now be explained in the detailed description given below: the aim of the description is purely illustrative and in no way exhaustive, in particular as regards the substitution of nickel with cobalt. The metal wire forming the subject of the invention is the usual metal wire well known in rubber technology, in particular tire technology. It is drawn to a diameter of between 0.12 and 0.50 millimeters and specially used, in strands, to form the cords employed as reinforcing elements, particularly in rubberized fabrics.

The above-mentioned wire, while still at a diameter greater than that of its final use, is coated with a first protective layer, composed of a nickel and zinc alloy, which contains a proportion of zinc variable between 60% and 90%, while the remaining proportion is nickel; said layer, obviously, will contain other metals, but only in the form of impurities, namely in substantially irrelevant amounts, measured as very small percentages of concentration.

The deposition of the above-mentioned alloy, effected in a galvanizing bath using standard methods well known to scientists, may be carried out in two different ways.

In the first method, zinc and nickel are deposited on the wire separately and one after the other; subsequently, an appropriate thermal treatment, i.e., heating of the wire, brings about reciprocal diffusion of the two metals, leading to the formation of the Zn/Ni alloy.

The preferred percentages of the two metals in this first layer, whose function is to protect the wire from corrosion, is of the order of 70% Zn and 30% Ni.

Alternatively, the two metals may be deposited in the desired percentages, simultaneously, using a single galvanizing bath, in this way obtaining a wire already coated with the desired alloy. One possible operating method is to use a galvanizing bath, the composition of which is given below, the bath being effected under the following conditions:

Temperature ranging between 10° C. and 30° C.
pH value ranging between 4 and 8.
Density of current (Ampere/dm$^2$) ranging between 10 A/dm$^2$ and 30 A/dm$^2$-Composition of bath (grams/liter):
NiSO$_4$-hexahydrated nickel sulphate: 170 gr/l
ZnSO$_4$-Zinc sulphate: 10 gr/l
H$_3$BO$_3$-Borax: 10 gr/l
NH$_4$Cl-Ammonium chloride: 14 gr/l
NaC$_{12}$H$_{25}$SO$_4$-Sodium lauryl sulphate: 1 gr/l The preferred thickness of this first layer, independently of the manner in which it is obtained, is between 0.25 and 2 micron. Thus treated, the wire is then coated with a second layer, also a Zn/Ni alloy, but with the percentages of metals substantially the inverse of those of the first layer, and more precisely having a nickel content of between 60% and 80%, the remaining percentage on the total of 100% being made up with zinc, not considering the presence of the already mentioned impurities. In any case the difference between the quantity of nickel (in %) contained in the two radially superimposed layers will preferably be not less than 20%.

Obviously, as regards the second layer the deposit of the two metals cannot be effected in two separate and subsequent phases as indicated above, but must be carried out in a single phase, i.e., by co-deposition of the two metals; in the contrary case, the thermal treatment necessary for the creation of the alloy by diffusion of the two metals would effect also the radially inner layer, already deposited, bringing about a diffusion of all metals forming the coating and the consequent creation of a substantially homogeneous single layer, thus going against the teaching of the present invention. If the deposit occurs in a single phase, one possible operating method is to use a bath, the composition of which is given below, the bath being effected in the following conditions:

Temperature ranging between 60° C. and 80° C.
pH value ranging between 4 and 8.
Density of current ranging between 5 A/dm$^2$ and 30 A/dm$^2$ Composition of bath (grams/liter):
NiSO$_4$-hexahydrated nickel sulphate: 170 gr/l
ZnSO$_4$-zinc sulphate: 1 gr/l
H$_3$BO$_3$-Borax: 10 gr/l
NH$_4$Cl-Ammonium chloride: 14 gr/l
NaC$_{12}$H$_{25}$SO$_4$-Sodium lauryl sulphate: 1 gr/l The preferred thickness of this second layer is between 0.25 and 2 micron; moreover, the thicknesses of the two layers are combined together, so that the final thickness of the coating preferably ranges between 0.50 and 4 micron.

It is evident that the thickness of each layer of the coating and that of the coating in its entirety is that found on removal from the galvanizing bath, i.e., prior to any operation which may alter said value, in particular prior to any drawing. After the two layers of coating have been deposited in the manner and with the characteristics desired, the diameter of the wire is brought to its final value by being drawn one or more times.

In this way a wire is made, provided with two radially super-imposed coaxial layers in Zn/Ni alloy, each having a different function, that of the radially innermost layer being resistance to corrosion and that of the radially outermost layer being improved adhesion to the elastomeric material.

This wire has demonstrated a level of higher quality than any other known wire, in terms of both the required characteristics. These superior qualities of the wire according to the invention in comparison with the already known wires are clearly brought out by the tests which are described in detail herebelow.

EXAMPLE I

A wire obtained as described above by two successive co-depositions of Zn and Ni from galvanizing baths and by a further drawing to bring it to the final diameter of 0.175 mm, provided with a coating (coating 1) formed by a radially inner layer, 0.1 micron in thickness, constituted by 70% of Zn and 30% of Ni, and by a radially external layer, 0.1 micron in thickness, constituted by 30% of Zn and 70% of Ni, was suspended in a climatic chamber at 45° C. and at 90% relative humidity (R.H.). The commonly used wire, having the same diameter, provided with a coating (coating 2) constituted by a layer, 0.2 micron in thickness, of an alloy containing 35% Zn and 65% Cu, obtained according to the conventional techniques, was suspended in the same environment.

The tensile strengths (T.S.) of the wires was measured after different times of stay in these conditions, intended to facilitate a quick corrosion with formation of rust. The percent decay of the tensile strengths (T.S.%) can be considered as a measure of the entity of the corrosion process.

Said percent decay was calculated by the formula:

$$TS\% = (\text{initial } TS - \text{final } TS)/\text{initial } TS \times 100$$

The following results were obtained:

| DAYS OF STAY IN THE CLIMATIC CHAMBER | TS | |
|---|---|---|
|  | Coating 1 | Coating 2 |
| 15 | 1% | 38% |
| 30 | 10% | 65% |

From these results, it is evident that in the wires coated according to the present invention the resistance to corrosion is considerably higher.

EXAMPLE II

The same test described in Example I was carried out on wires having a diameter of 0.25 mm and provided with a coating, 0.25 micron in thickness, which—in the wire produced according to the present invention—was formed by two concentric layers of 0.125 micron each.

The following results were obtained:

| DAYS OF STAY IN THE CLIMATIC CHAMBER | TS % | |
|---|---|---|
|  | Coating 1 | Coating 2 |
| 15 | 0% | 17% |
| 30 | 5% | 38% |

Also in this case a high resistance to corrosion is shown by the wires obtained according to this invention.

EXAMPLE III

This test concerned the adhesion of 7×4×0.175 cords, with the wires described in Example I, to rubber compounds after vulcanization and the persistence of the adhesion value after ageing at high temperatures and in the presence of relevant values of relative humidity (R.H.).

The compounds tested had the following composition (in parts on 100 rubber parts):

| | COMPOUND A | COMPOUND B |
|---|---|---|
| Natural Rubber | 100 | 100 |
| Zinc oxide - ZnO | 8 | 8 |
| Antiozonant - 6 PPD | 2 | 2 |
| Antioxidant - TMQ | 1 | 1 |
| Resorcin | 2 | — |
| Hexamethoxymethylmelamine - Cyrez 963 | 5 | — |
| Cobalt complex salt - Manobond 680C | — | 0.5 |
| Carbon black - HAF | 50 | 50 |
| Accelerator - Santocure MOR | 0.7 | 1 |
| Sulphur | 3.5 | 6 |

The adhesion was tested by the measuring force necessary to extract the cord from a small cylinder of vulcanized rubber, a test which is described in Kautschuk and Gummi Kunststoffe, Vol. 5, 1969, pages 228-232. The specimens were cured for 30' at 151° C.; the pulling force was measured by an electronic dynamometer. The thickness of the rubber layer covering the cord extracted from the specimen, evaluated by comparison with standard specimens and expressed by a "coating index", indicated the percentage of the cord surface which was still well rubberized. When the value of the "coating index" was high, the detachment of the cord from the compound occurred by insufficient cohesion of the latter and not by insufficient adhesion of the rubber/metal interface.

The specimens were aged in a climatic chamber at 65° C. and at 90% relative humidity.

The results obtained are reported in the following table, where PF indicates the value of the pulling force (measured in newtons) and CI the value of the coating index.

| TIME | | COMPOUND A | | COMPOUND B | |
|---|---|---|---|---|---|
| | | Coat 2 | Coat 1 | Coat 2 | Coat 1 |
| Initial | PF | 765 | 760 | 803 | 800 |
| | CI | 100 | 100 | 100 | 100 |
| After 4 days | PF | 660 | 740 | 710 | 780 |
| | CI | 70 | 100 | 70 | 100 |
| After 8 days | PF | 350 | 730 | 350 | 765 |
| | CI | 10 | 90 | 20 | 90 |

These results demonstrate the marked improvement in the adhesion persistence under ageing ascertained in the cords built up with the wires coated in accordance with the present invention.

EXAMPLE IV

The tests were carried out as described in Example III, but on 2×2×0.25 cords built up with the wires described in Example II. The results obtained expressed with the same parameters as in the preceding Table, are reported below:

| TIME | | COMPOUND A | | COMPOUND B | |
|---|---|---|---|---|---|
| | | Coat 2 | Coat 1 | Coat 2 | Coat 1 |
| Initial | PF | 270 | 280 | 285 | 290 |
| | CI | 100 | 100 | 100 | 100 |
| After 4 days | PF | 270 | 270 | 290 | 280 |
| | CI | 100 | 100 | 100 | 100 |
| After 8 days | PF | 60 | 260 | 70 | 250 |
| | CI | 20 | 100 | 20 | 90 |

Also in connection with this cord, the results demonstrate the considerable improvement in the resistance to ageing of the bond when use is made of the wires coated with the double layer of Ni/Zn alloy in accordance with the present invention.

It is considered that the very good results obtained may depend on the reasons indicated herebelow which, however, are not to be regarded as a limitation of any kind in respect of the present invention.

First of all, the Zn/Ni alloy (in a wide field of variable reciprocal percentages) forms coatings much more compact than those obtainable with brass and non-porous; further, the process of dezincification is slowed significantly in comparison with Cu/Zn alloys.

The nickel forms fine and compact layers of sulphide which adhere very well both to the rubber and to the underlying anti-corrosive layer containing a high Zn percentage; further, the alloys according to this invention are very ductile, thus offering greater advantages as regards wire drawability. Moreover, the Zn/Ni alloy tends to be self-leveling, having as a result highly smooth surfaces, even when deposited on uneven surfaces.

Finally, it is emphasized that good behavior, in part with substantially analogous results, may be obtained by substituting the zinc with aluminum, in this case, however, encountering difficulties in the electro-deposition of this metal. As regards the nickel, it has already been pointed out that this can be replaced by cobalt so that, in the present specification, any reference to nickel represents an equivalent reference to cobalt; consequently, the invention is not restricted to the use of the Zn/Ni alloy, but comprises the use of a Zn/Co alloy.

What is claimed is:

1. A metal wire for the reinforcement of articles of elastomeric material, provided with an anticorrosion coating and suitable for adhesion to the elastomeric material into which said wire is to be incorporated, the coating being substantially composed of a zinc and nickel alloy, wherein said coating comprises two concentric layers, arranged radially one above the other, each layer being made of a Zn/Ni alloy, the layer with the highest percentage of Zn being the radially inner layer.

2. A metal wire as in claim 1, wherein the difference between the percent values of Ni in the two superimposed layers is not less than 20%.

3. A metal wire as in claim 1, wherein the percentage of Zn in the radially inner layer ranges between 60% and 90%.

4. A metal wire as in claim 1, wherein the percentage of Ni in the radially outer layer ranges between 60% and 80%.

5. A metal wire as in claim 1, wherein the total thickness of the coating is not greater than 4 microns.

6. A metal wire as in claim 1, wherein the thickness of the radially inner layer ranges between 0.25 and 2 microns.

7. A metal wire as in claim 1, wherein the thickness of the radially outer layer ranges between 0.25 and 2 microns.

8. A metal wire as in claim 1, wherein the radially inner layer is obtained by electro-deposition of Zn and Ni in two successive steps and by a subsequent formation of the alloy by diffusion due to thermal treatment.

9. A metal wire as in claim 1, wherein each of the two layers is deposited on the wire by galvanic codeposition of the two metals forming the alloy.

10. A metal wire as in claim 1, wherein the wire is coated by the said two layers prior to being drawn to its final diameter.

11. A metal wire as in any one of claims 1 to 10, wherein the nickel is entirely replaced by cobalt.

* * * * *